United States Patent [19]

Serad et al.

[11] Patent Number: 5,462,973
[45] Date of Patent: Oct. 31, 1995

[54] SEPARATION OF POLYETHYLENE TEREPHTHALATE AND POLYVINYL CHLORIDE USING SUPERCRITICAL CARBON DIOXIDE

[75] Inventors: George A. Serad, Charlotte, N.C.; Theodore S. Thornburg, Rock Hill, S.C.

[73] Assignee: Hoechst Celanese Corporation, Somerville, N.J.

[21] Appl. No.: 274,508

[22] Filed: Jul. 13, 1994

[51] Int. Cl.$^6$ ............................................. C08J 9/26
[52] U.S. Cl. ..................... 521/62; 210/774; 521/138; 521/145; 521/182
[58] Field of Search .................... 210/774; 521/62

[56] References Cited

U.S. PATENT DOCUMENTS

| | | |
|---|---|---|
| 4,473,665 | 9/1984 | Martini-Vvedensky et al. |
| 5,126,058 | 6/1992 | Beckman . |
| 5,158,986 | 10/1992 | Cha et al. |
| 5,196,575 | 3/1993 | Sebastian . |

FOREIGN PATENT DOCUMENTS

| | | |
|---|---|---|
| 0469903A2 | 5/1992 | European Pat. Off. . |
| 0512464A1 | 11/1992 | European Pat. Off. . |
| 535419A1 | 7/1993 | European Pat. Off. . |

OTHER PUBLICATIONS

Nam P. Suh et al., "Synthesis and Analysis of Gas/Polymer Solutions for Ultra–Microcellular Plastics Production", Jan. 1993, In the Proceedings of the 1993 NSF Design and Manufacturing Systems Conference.

Daniel F. Baldwin et al., "Gas Dissolution and Crystallization in Microcellular Thermoplastic Polyesters", 1992, MD–vol. 38, Cellular Polymers ASME 1992.

D. F. Baldwin et al., "Microcellular Poly(ethylene terephthalate) and Crystallizable Poly(ethylene terephthalate): Characterization of Process Variables", 1992, SPE Technical Papers vol. XXXVIII, 1992.

S. W. Cha et al., "Room–Temperature Microcellular Foaming", 1992, SPE Technical Papers vol. XXXVIII, 1992.

*Primary Examiner*—Morton Foelak
*Attorney, Agent, or Firm*—Philip P. McCann

[57] ABSTRACT

A method for separating co-mingled polymeric materials, in particular polyethylene terephthalate (PET) and polyvinyl chloride (PVC) is described. The process involves selectively dissolving a supercritical fluid into one of the materials at the appropriate temperature and pressure. Upon rapid reduction of the system pressure, the selected material foams providing a change in density. Under ambient conditions, the polymeric materials having a large density difference can be separated by means of aqueous separation and flotation. The preferred supercritical fluid for the process is carbon dioxide, and PVC is the material into which the supercritical fluid is preferentially dissolved.

5 Claims, No Drawings

SEPARATION OF POLYETHYLENE TEREPHTHALATE AND POLYVINYL CHLORIDE USING SUPERCRITICAL CARBON DIOXIDE

FIELD OF THE INVENTION

The present invention relates to a process of selectively foaming a compound among a mixture of co-mingled materials in a supercritical fluid to provide a large density difference between the compounds such that they can be separated at ambient conditions by selective density flotation.

BACKGROUND OF THE INVENTION

The disposal of waste materials has become a pressing issue in today's society. Environmental concerns associated with disposal of waste materials, for example, have made recycling of materials a popular alternative to landfills and incineration. Polymers constitute a large percentage of waste materials and are present among the materials in many curbside recycling programs. Co-mingled polymeric waste is often mixed with paper labels, glass, wood, etc. These contaminants must be eliminated before the materials can be processed. However, removal of contaminants also includes the separation of undesirable polymer mixtures such as polyethylene terephthalate (PET) and polyvinyl chloride (PVC). Failure to separate materials completely can lead to degradation and impurities in the recycled end products in addition to causing processing difficulties. Hand sorting and optical-mechanical scanners are often ineffective means to accomplish the necessary separations.

The effective recovery and utilization of PET from polymer waste requires that the PET be recovered free of other polymers such as polyolefins and PVC. Several methods are used to accomplish this separation.

Solvents are used to selectively dissolve individual polymers as is the case in U.S. Pat. No. 5,198,471. This approach is unattractive because of the need to use organic solvents and handle polymer solutions. Conventional techniques must be employed for extracting a polymer from a solvent in a solution. These methods create additional waste disposal and solvent handling issues.

A preferred separation technique involves aqueous flotation of the polymer waste which capitalizes on the density differences between polymers. This approach is effective in separating the polyolefins from PET because of the large density difference (e.g. 0.9 for the polyolefins versus 1.3–1.4 for the PET). However, PVC has a density very close to PET and cannot be separated from PET without some additional techniques. European Patent Nos. 469,903A2 and 512,464A1 involve the use of surfactants to assist in the float/sink phenomena.

A method of separating incompatible plastics having only slightly different densities by selective density flotation of the materials in a fluid in the vicinity of its critical point is disclosed in U.S. Pat. No. 5,126,058. A supercritical fluid can be defined as a material which is maintained at a temperature which exceeds a critical temperature and at a pressure which exceeds a critical pressure so as to place the material in a supercritical fluid state. In a supercritical state, the supercritical fluid has properties which cause it to act as both a gas and a liquid. In U.S. Pat. No. 5,126,058 a supercritical fluid is used to separate plastic components selectively in order of increasing density in succession by adjusting the temperature of the supercritical fluid in the vessel. The entire process is conducted under supercritical fluid conditions including the separation. Disadvantages with this process include high equipment costs due to the long supercritical fluid exposure time, and the separation process must be operated under high pressure conditions.

However, a need still exists for a method of separating co-mingled polymers of similar density (i.e. PET and PVC) which is more efficient and economical.

SUMMARY OF THE INVENTION

Generally, the present invention entails a method of selectively separating a compound material from a mixture of co-mingled materials having similar densities by selectively foaming a material to reduce its apparent density such that it can be separated from the said mixture by ambient pressure, aqueous flotation consisting of the following steps:

(a) introducing said mixture of co-mingled materials into a vessel;

(b) introducing a fluid into said vessel and adjusting the temperature and pressure in said vessel above the critical point of said fluid so as to convert said fluid to a supercritical fluid if said fluid was not introduced under supercritical conditions;

(c) adjusting the temperature and pressure of the contents of the vessel so as to selectively dissolve the supercritical fluid into one of the co-mingled materials;

(d) rapidly reducing the pressure so as to reduce the fluid solubility in the desired material causing the desired material to foam.

(e) removing the co-mingled materials from the vessel to ambient conditions with the foamed component now having a bulk density below about one.

(f) flotation separation at ambient conditions of the foamed compound.

DETAILED DESCRIPTION OF THE INVENTION

The present invention is directed to a method for separating co-mingled polymeric materials, in particular polyethylene terephthalate (PET) and polyvinyl chloride (PVC). The process involves selectively dissolving a supercritical fluid into one of the materials at the appropriate temperature and pressure. Thus, the selected material foams corresponding to a change in bulk density. Under ambient conditions, the polymeric materials can be separated by means of aqueous separation and flotation.

The preferred supercritical fluid for the process is carbon dioxide. Treatment of materials with supercritical carbon dioxide is already a commercial practice, e.g. in the food industry for extraction of caffeine from coffee beans.

The process of U.S. Pat. No. 5,126,058 involves conducting the separation of plastics by flotation in a supercritical media. The density of the supercritical fluid is modified by varying the temperature and pressure permitting the different density plastics to float to the surface. The entire process of U.S. Pat. No. 5,126,058 is conducted under supercritical fluid conditions, including the separation. In contrast, the process of the present invention involves a short exposure time to supercritical carbon dioxide to foam the PVC. The actual separation is subsequently conducted under ambient pressure and temperature using an aqueous flotation process. Air is bubbled into the water to assure complete wetting and aid the separation. Other means of supplying the necessary agitation to thoroughly wet the co-mingled materials and facilitate flotation such as the addition of a frothing agent are within the scope of the present invention.

Mixtures of the polymer films were exposed to carbon dioxide (near and within the supercritical range) using a series of temperatures (30°–150° C.), pressures (1– 600 atmospheres) and exposure times (10–120 minutes). The goal was to define conditions that would foam the PVC but not the PET. The formation of microbubbles in polymers is discussed in U.S Pat. Nos. 4,473,665 and 5,158,986. A distinguishing feature of the present invention is that conditions are defined to preferentially foam one polymer (i.e. PVC) in a polymer mixture whereas the prior art focuses on making and using supermicrocellular foamed plastic materials in order to improve mechanical properties such as impact strength.

In the example of the present invention, a relative rating scale of 1–10 was defined to characterize the separation effectiveness. A 10 was complete separation whereas 1 was no separation. No separation could result when both or neither polymer floated on the water surface. Table 1 summarizes the data.

An optimum separation exists at 1) a pressure between 72.9 atmospheres (the critical pressure of carbon dioxide) and 300 atmospheres and 2) a temperature range from 31.2° C. (the critical temperature of carbon dioxide) and 140° C. where the PVC began to degrade. Outside this region both or neither of the polymers floated on the water. An exposure time of ten minutes was sufficient to obtain sufficient PVC foaming for separation. Shorter times may be possible but ten minutes is preferred. The exposure time of ten minutes assures foaming but avoids the potential process control concerns that arise with shorter times.

The PET was obtained from a carbonated beverage bottle. The initial PVC sample was a film from a photograph holder. Subsequent PVC was from a detergent bottle. The polymers were chopped to less than one inch by one inch and had a thickness from 0.01 to 0.03 inches.

The experimental work was initially conducted with a clear PVC film (0.010 to 0.013 inch thickness) and a green PET film (carbonated beverage bottle) cut into small rectangular chips. The clear and green were selected to easily observe the separation effectiveness with the aqueous flotation technique.

All experiments were performed with a Dionex Supercritical Fluid Extraction Unit (SFE model 703). The carbon dioxide used was a SFE-SFC (supercritical fluid extraction-supercritical fluid chromatography) grade with a dip tube to transport the liquid carbon dioxide. The fluid could be either in the gaseous state, in the liquid state, or in the supercritical range when it was introduced into the unit. The temperature and pressure of the vessel were adjusted to above the critical point of the fluid so as to convert the fluid to a supercritical fluid if it was not introduced under supercritical conditions.

The temperature and pressure of the contents of the vessel were then adjusted to selectively dissolve the supercritical fluid into one of the co-mingled materials. The pressure was rapidly reduced so as to reduce the fluid solubility in the desired material causing the desired material (PVC) to foam. The co-mingled materials were removed from the vessel to ambient conditions with the foamed component now having a bulk density below about one.

After exposure to the supercritical carbon dioxide, the PVC was separated by aqueous flotation. The PVC which floated on the water had changed appearance. Prior to treatment with the supercritical carbon dioxide, it was transparent, but after exposure it became white and opaque. This difference in appearance can be accounted for due to the formation of microbubbles resulting from supercritical carbon dioxide exposure. The original film had no sign of voids whereas the treated film has a plurality of voids, mostly in the 1 micron range, with the appearance of a closed cell structure. The bulk density of the original film was approximately 1.23 g/cc whereas after the supercritical carbon dioxide treatment the density dropped to 0.65 g/cc. The density that resulted after treatment is quite different from the density of PET which is about 1.3 to 1.4 g/cc. Therefore, an easy separation results.

The experiments were repeated on PVC samples of a different thickness. This was tested by using chips cut from a PVC plastic bottle having a larger thickness (i.e. 0.022–0.030 inches). The sample was treated in the optimum range defined above (i.e. 60 ° C., 160 atmospheres for 10 minutes). The PVC foamed readily and was easily separated from the PET by aqueous flotation.

EXAMPLE

PET and PVC samples of approximately 1.5 grams each were placed in a 10 ml stainless steel high pressure screw top cell. The cell was firmly tightened and placed into the unit's oven and tightened into position using the finger-tight ferrules. A glass collection vial was placed into the corresponding vial holder to collect any extract. The vial holder and oven doors were closed and sealed using the systems pneumatic pump which is powered by a Jun-Air compressor model #6. The system was then heated to the desired temperature (ranging from 31° C. to 150° C.). When the temperature stabilized, the cell was pressurized to the target level (ranging from 150 atm to 600 atm). The unit was maintained in a constant flow mode for the selected time (ranging from 10 to 120 minutes).

The system was then depressurized and allowed to cool to ambient conditions while the polymer remained in the cell. The polymers were removed from the cell, placed in a beaker of tap water and agitated by bubbling air into the beaker to allow them to wet completely. Separation effectiveness was observed and recorded as shown in Table 1.

TABLE 1

SEPARATION OF PVC AND PET BY FOAMING THE PVC WITH $CO_2$

| Run | Pressure (atm) | Temperature (°C.) | Rating | Run Time (min) | % PVC Floating | % PET Floating |
|---|---|---|---|---|---|---|
| 1 | 160 | 30 | 1 | 10 | 0 | 0 |
| 3 | 160 | 30 | 1 | 30 | 0 | 0 |
| 4 | 340 | 30 | 3 | 10 | 10 | 0 |
| 8 | 340 | 30 | 3 | 30 | 10 | 0 |
| 11 | 600 | 30 | 1 | 10 | 0 | 0 |
| 13 | 250 | 60 | 10 | 15 | 100 | 0 |
| 10A | 340 | 80 | 5 | 120 | 100 | 50 |
| 10B | 340 | 80 | 5 | 30 | 100 | 50 |
| 10C | 340 | 80 | 8 | 15 | 100 | 10 |
| 10D | 1 | 80 | 1 | 30 | 0 | 0 |
| 9 | 250 | 90 | 8 | 20 | 100 | 10 |
| 12 | 250 | 90 | 10 | 10 | 100 | 0 |
| 2 | 340 | 150 | 5 | 30 | 100* | 50 |
| 5 | 160 | 150 | 5 | 30 | 100* | 50 |
| 6 | 160 | 150 | 5 | 10 | 100* | 50 |
| 7 | 340 | 150 | 4 | 10 | 100* | 70 |
| 14 | 160 | 80 | 10 | 10 | 100 | 0 |
| 15 | 200 | 100 | 10 | 10 | 100 | 0 |
| 16 | 160 | 50 | 8 | 10 | 80 | 0 |

Note: PVC shows, signs of thermal degradation

Although many temperature and pressure combinations were tried by experimentation, an optimum separation was determined to exist at 1) a pressure between 72.9 atmospheres (the critical pressure of carbon dioxide) and 300 atmospheres and 2) a temperature range from 31.2° C. (the critical temperature of carbon dioxide) and 140° C. where the PVC began to degrade.

Thus, it is apparent that there has been provided, in accordance with the invention, a method of selectively separating a compound material from a mixture of co-mingled materials having similar densities by selective density flotation after treatment of selected compound with a supercritical fluid, that fully satisfies the objects, aims, and advantages as set forth above. While the invention has been described in conjunction with the specific embodiments thereof, it is evident that many alternatives, modifications and variations will be apparent to those skilled in the art in light of the foregoing description. Accordingly, it is intended to embrace all such alternatives, modifications and variations as fall within the sphere and scope of the invention.

We claim:

1. A method of selectively separating a polymeric material from a mixture of co-mingled polymeric materials having similar densities consisting of the following steps:
   (a) introducing said mixture of co-mingled polymeric materials into a vessel;
   (b) introducing a fluid into said vessel and adjusting the temperature and pressure in said vessel above the critical point of said fluid so as to convert said fluid to a supercritical fluid if said fluid was not introduced under supercritical conditions;
   (c) adjusting the temperature and pressure of the contents of the vessel so as to selectively dissolve said supercritical fluid into one of the co-mingled materials;
   (d) rapidly reducing the pressure so as to reduce the fluid solubility in the selected material causing the selected material to foam and thereby have a reduced apparent density;
   (e) removing the co-mingled materials from the vessel to ambient conditions with the foamed material now having a bulk density below about one;
   (f) separating the foamed material from the mixture by aqueous flotation at ambient pressure.

2. A method according to claim 1 wherein said supercritical fluid is a carbon dioxide fluid which is in its supercritical state.

3. A method according to claim 2 wherein said co-mingled materials are polyvinyl chloride and polyester wherein polyvinyl chloride is the material into which the supercritical fluid is dissolved.

4. A method according to claim 3 wherein said temperature is from about 31.2° C. to about 140° C. and said pressure is from about 72.9 atmospheres to about 300 atmospheres.

5. A method according to claim 1 wherein said temperature is from about 31.2° C. to about 140° C. and said pressure is from about 72.9 atmospheres to about 300 atmospheres.

* * * * *